Patented Dec. 30, 1947

2,433,595

UNITED STATES PATENT OFFICE 2,433,595

CARBAMATE PLASTICIZERS FOR NATURAL AND SYNTHETIC RUBBER

Arthur W. Campbell, Terre Haute, Ind., assignor to Commercial Solvents Corporation, Terre Haute, Ind., a corporation of Maryland No Drawing. Application March 13, 1944, Serial No. 526,315

6 Claims. (Cl. 260—36)

My invention relates to a class of new plasticizers for natural and various types of synthetic rubber. More particularly, it is concerned with the use of substituted alkyl carbamates as plasticizers for the aforesaid types of rubber, said carbamates having the following general structural formula:

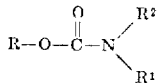

wherein R represents a member selected from a group consisting of alkyl and nitroalkyl, $R^1$ represents a substituent selected from a class consisting of alkyl, aryl, 1-ethyl-4-(1-ethylpentyl)-3,5-dioxacyclohexyl and tetrahydrofurfuryl, $R^2$ represents a substituent selected from a class consisting of hydrogen, and nitroalkyl, $R^1$ and $R^2$ together may represent substituents selected from a class consisting of dialkyl and diaryl, and $R^1$ and $R^2$ may also represent a combined group selected from a class consisting of polymethylene and oxapolymethylene the terminal carbon atoms of which are bonded to N.

Several plasticizers or softeners have been proposed for natural and various types of synthetic rubber and in certain instances have functioned as such in a relatively efficient manner. Dibutyl phthalate and tricresyl phosphate are among those materials that have previously been used in this capacity. When these compounds exhibit reasonably good softening properties, they are not entirely free from certain material disadvantages such as a comparatively high freezing point and only fair compatibility with the rubber to be plasticized. These defects are obviously of a serious nature since the presence of either tends to bring about premature failure of the rubber article in which the proposed softener has been incorporated.

I have now discovered a class of compounds, the carbamic acid esters of the types specified above, which exhibit considerably improved plasticizing properties and compatability, as well as a lower freezing point over those materials previously employed as softeners for rubber.

In practicing my invention, the substituted alkylcarbamates can be incorporated in substantially any standard rubber compounding mixtures containing the rubber to be softened. The crude rubber is masticated by passing it through a cold, tight rolling mill several times (5 passes are ordinarily sufficient), pulling the sheet out without folding it each time it passes through the roll. After the rubber has been thoroughly masticated, the other ingredients of the stock are added, the plasticizer being introduced last. Thereafter the stock is thoroughly mixed, the resulting samples placed in an extrusion plastometer of conventional design and the number of seconds required for a given weight of plasticized rubber to be forced from a chamber having an orifice of definite size, under predetermined conditions of temperature and pressure is measured. A suitable design of extrusion plastometer is described in "Rubber Chemistry and Technology," vol. 9, pp. 496-501. The apparatus there shown was the type employed in the tests discussed below.

In addition to serving as plasticizers for natural rubber, the substituted alkyl carbamates of my invention are especially useful as softeners for various classes of synthetic rubber, such as for example, co-polymers of varying percentages of 1,3-butadiene and acrylonitrile; chloroprene polymers; co-polymers of 1,3-butadiene and styrene, and the like. In general it may be said that these substituted alkyl carbamates function satisfactorily as plasticizers for any synthetic rubber having as a common unit the 1,3-butadiene structure, or a co-polymer of an unsaturated compound having the 1,3-butadiene structure and the polymerizable structure

As examples of unsaturated monomers capable of being co-polymerized with a 1,3-butadiene hydrocarbon and having the polymerizable structure last indicated above, there may be mentioned styrene, acrylonitrile, methylacrylonitrile, isobutylene, methyl vinyl ether, vinylidene chloride, methyl 1-methylvinyl ketone, and the like. The co-polymerization of compounds containing the 1,3-butadiene skeleton, with unsaturated compounds of the type mentioned immediately above may be accomplished by means of a number of known methods, such as homogeneous polymerization, polymerization in aqueous emulsion, and the like.

The quantity of plasticizer utilized will generally be found to depend upon the particular type of polymer under consideration and the degree of softness desired. While I have found that the plasticizers of my invention are compatible with both natural and synthetic rubber of the general type indicated above, in amounts covering a wide range of proportions, it will ordinarily be observed that such softeners are most advantageously employed in concentrations varying from about 10 to 45 parts by weight for each 100 parts by weight of rubber. Obviously the optimum concentration of plasticizer will vary with the type of rubber to be plasticized.

The substituted alkyl carbamates employed as softeners in my invention may be conveniently synthesized by known methods. A procedure which I have found particularly satisfactory for the synthesis of such compounds involves reacting the desired primary or secondary amine and alkyl chloroformate in equimolecular proportions in a suitable solvent such as benzene. Specifically such procedure involves first dissolving the alkyl chloroformate in the solvent and then adding the amine dropwise while cooling and agitating the reaction mixture. Upon addition of the amine, the corresponding substituted ammonium chloride is observed to separate. This product may be collected on a filter and the benzene contained in the filtrate removed therefrom by distillation under reduced pressure, leaving as a residue the desired substituted alkyl carbamate. Further purification of this product, if a solid, may be effected by recrystallization from benzene, toluene or similar solvents; if it is normally a liquid, purification can be readily effected by fractional distillation.

In determining the plasticizing ability of the substituted alkyl carbamates, a mixture having the following composition was employed:

| | Parts by weight |
|---|---|
| Butadiene-acrylonitrile copolymer | 100.0 |
| Zinc oxide | 5.0 |
| Stearic acid | 1.0 |
| Altax (benzothiazyl disulfide) | 1.5 |
| Sulfur | 1.5 |
| Channel black | 50.0 |
| Plasticizer | 30.0 |

The copolymer was masticated by 5 passes through a cold tight mill, pulling the sheet out without folding each time it was passed through the roll. To this, the compounding ingredients were added and the product thus obtained was then subjected to tests in an apparatus of the type previously referred to. The data appearing in the table below represent the time required to extrude a specified quantity of rubber through an orifice of given size under a predetermined pressure and under constant temperature of stock and die (172° F.).

Table I

| Compound | Air Pressure on Diaphragm | |
|---|---|---|
| | 5.5 lb., time, sec. | 7.5 lb., time, sec. |
| Amyl dibutylcarbamate | 9 | 4 |
| Butyl diamylcarbamate | 10 | 3 |
| Amyl diamylcarbamate | 12 | 3 |
| Hexyl diamylcarbamate | 12 | 3 |
| Hexyl dibutylcarbamate | 16 | 4 |
| Butyl dibutylcarbamate | 17 | 3 |
| Butyl bis(1-methylheptyl)-carbamate | 18 | 5 |
| Butyl diisopropylcarbamate | 22 | 6 |
| Butyl diethylcarbamate | 23 | 10 |
| Butyl butylphenylcarbamate | 25 | 7 |
| Butyl tetrahydrofurfurylisopropylcarbamate | 45 | 9 |
| Butyl piperidylcarbamate | 40 | 15 |
| Butyl 3-oxapentamethylenecarbamate | 46 | 18 |
| Ethyl dibutylcarbamate | 55 | 22 |
| Ethyl phenylcarbamate | 58 | 23 |
| Ethyl diphenylcarbamate | 78 | 31 |
| Ethyl butylcarbamate | 192 | 82 |
| Butyl N-[1-ethyl-4-(1-ethylpentyl) 3,5-dioxacyclohexyl] carbamate | 23 | 9 |
| Butyl N-2-nitroisobutyl N-isopropylcarbamate | 20 | 19 |
| 2-Nitroisobutyl N-2-nitro isobutyl N-isopropylcarbamate | 32 | 25 |
| Dibutyl phthalate | 37 | 19 |
| Standard batch, without plasticizer | 828 | 366 |

A second mixture identical in composition with the one given above, with the exception that another copolymer of 1,3-butadiene and acrylonitrile was substituted for that used previously, was subjected to a series of plasticity tests and the following results were obtained:

Table II

| Compound | Air Pressure on Diaphragm | |
|---|---|---|
| | 5.5 lb., time, sec. | 7.5 lb., time, sec. |
| Dibutyl phthalate | 12 | 8 |
| Tricresyl phosphate | 12 | 9 |
| Butyl diethylcarbamate | 6 | 8 |
| Butyl dibutylcarbamate | 10 | 4 |
| Standard batch, without plasticizer | 1,650 | 291 |

The ability of the aforesaid carbamates to plasticize natural rubber as well as additional types of synthetic rubber is demonstrated by the data appearing in the table below. In this particular series of experiments butyl dibutylcarbamate was employed as the plasticizer throughout. The stock used was of the same composition as that previously used with the exception that the rubbers indicated were substituted for the previously employed butadiene-acrylonitrile polymer.

Table III

| Rubber | Air Pressure on Diaphragm | |
|---|---|---|
| | 4.0 lb., time, sec. | 5.5 lb., time, sec. |
| Butadiene-styrene polymer—unplasticized | 305 | 65 |
| Butadiene-styrene polymer—plasticized | 18 | 8 |
| Natural—unplasticized | 270 | 270 |
| Natural—plasticized | 27 | 5 |
| Chloroprene polymer—unplasticized | 850 | 74 |
| Chloroprene polymer—plasticized | 10 | 2 |

It is to be strictly understood that the results of the tests in the above tables have been given for the purpose of illustration only and are not to be construed as limiting this invention in any respect. Other plasticizers of the class generally set forth herein may be incorporated in synthetic rubber of various types different from those present in the mixtures utilized in obtaining the data appearing above. Also additional materials such as pigments, fillers, vulcanizing agents, accelerators, anti-oxidants, as well as other softeners or mixtures of softeners of the present invention may be incorporated in the rubber compositions contemplated by my invention. In general, it may be said that any modifications or equivalents that would ordinarily occur to those skilled in the art are to be considered as lying within the scope of my invention.

My invention now having been described, what I claim is:

1. A composition of matter comprising a rubber material selected from the group consisting of natural rubber, a synthetic rubber prepared by polymerizing a 1,3-butadiene, and a synthetic rubber prepared by copolymerizing a 1,3-butadiene with an unsaturated compound polymerizable therewith and containing the group $CH_2=C=$ and, as a softener for the said rubber material, an N-substituted carbamate having the following general formula:

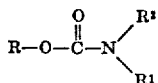

wherein R represents a member selected from a group consisting of alkyl and nitroalkyl, $R^1$ represents a substituent selected from a class consisting of alkyl, aryl, 1-ethyl-4-(1-ethylpentyl)-3,5-dioxacyclohexyl and tetrahydrofurfuryl, $R^2$ represents a substituent selected from a class consisting of hydrogen, and nitroalkyl, $R^1$ and $R^2$ together may represent substituents selected from a class consisting of dialkyl and diaryl, and $R^1$ and $R^2$ may also represent a combined group selected from a class consisting of polymethylene and oxapolymethylene the terminal carbon atoms of which are bonded to N.

2. The composition of claim 1 wherein the substituted carbamate is present in a concentration ranging from 10 to 45 per cent by weight based on the weight of the rubber.

3. A composition of matter comprising natural rubber and as a softener therefor an N-substituted carbamate having the following general formula:

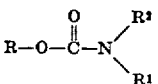

wherein R represents a member selected from a group consisting of alkyl and nitroalkyl, $R^1$ represents a substituent selected from a class consisting of alkyl, aryl, 1-ethyl-4-(1-ethylpentyl)-3,5-dioxacyclohexyl and tetrahydrofurfuryl, $R^2$ represents a substituent selected from a class consisting of hydrogen, and nitroalkyl, $R^1$ and $R^2$ together may represent substituents selected from a class consisting of dialkyl and diaryl, and $R^1$ and $R^2$ may also represent a combined group selected from a class consisting of polymethylene and oxapolymethylene the terminal carbon atoms of which are bonded to N.

4. A composition of matter comprising a copolymer of 1,3-butadiene and acrylonitrile, and as a softener therefor an N-substituted carbamate having the following general formula:

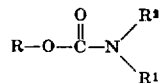

wherein R represents a member selected from a group consisting of alkyl and nitroalkyl, $R^1$ represents a substituent selected from a class consisting of alkyl, aryl, 1-ethyl-4-(1-ethylpentyl)-3,5-dioxacyclohexyl and tetrahydrofurfuryl, $R^2$ represents a substituent selected from a class consisting of hydrogen, and nitroalkyl, $R^1$ and $R^2$ together may represent substituents selected from a class consisting of dialkyl and diaryl, and $R^1$ and $R^2$ may also represent a combined group selected from a class consisting of polymethylene and oxapolymethylene the terminal carbon atoms of which are bonded to N.

5. A composition of matter comprising a copolymer of 1,3-butadiene and acrylonitrile, and a sufficient quantity of butyl dibutyl carbamate incorporated therein to soften said copolymer.

6. A composition of matter comprising a copolymer of 1,3-butadiene and acrylonitrile, and a sufficient quantity of amyl dibutyl carbamate incorporated therein to soften said copolymer.

ARTHUR W. CAMPBELL.

REFERENCES CITED

The following references are of record in the file of this patent:

UNITED STATES PATENTS

| Number | Name | Date |
|---|---|---|
| 2,041,733 | Werntz | May 26, 1936 |
| 2,182,359 | Smith | Dec. 5, 1939 |
| 2,197,479 | Meigs | Apr. 16, 1940 |
| 2,234,204 | Starkweather | Mar. 11, 1940 |
| 2,296,331 | Bogemann | Sept. 22, 1942 |

Certificate of Correction

Patent No. 2,433,595.    December 30, 1947.

ARTHUR W. CAMPBELL

It is hereby certified that errors appear in the printed specification of the above numbered patent requiring correction as follows: Column 1, line 22, for "closs" read *class*; line 31, for the word "When" read *While*; lines 49 and 50, for "mixtures" read *mixture*; and that the said Letters Patent should be read with these corrections therein that the same may conform to the record of the case in the Patent Office.

Signed and sealed this 27th day of April, A. D. 1948.

[SEAL]

THOMAS F. MURPHY,
*Assistant Commissioner of Patents.* an N-substituted carbamate having the following general formula:

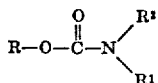

wherein R represents a member selected from a group consisting of alkyl and nitroalkyl, $R^1$ represents a substituent selected from a class consisting of alkyl, aryl, 1-ethyl-4-(1-ethylpentyl)-3,5-dioxacyclohexyl and tetrahydrofurfuryl, $R^2$ represents a substituent selected from a class consisting of hydrogen, and nitroalkyl, $R^1$ and $R^2$ together may represent substituents selected from a class consisting of dialkyl and diaryl, and $R^1$ and $R^2$ may also represent a combined group selected from a class consisting of polymethylene and oxapolymethylene the terminal carbon atoms of which are bonded to N.

2. The composition of claim 1 wherein the substituted carbamate is present in a concentration ranging from 10 to 45 per cent by weight based on the weight of the rubber.

3. A composition of matter comprising natural rubber and as a softener therefor an N-substituted carbamate having the following general formula:

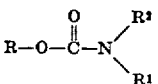

wherein R represents a member selected from a group consisting of alkyl and nitroalkyl, $R^1$ represents a substituent selected from a class consisting of alkyl, aryl, 1-ethyl-4-(1-ethylpentyl)-3,5-dioxacyclohexyl and tetrahydrofurfuryl, $R^2$ represents a substituent selected from a class consisting of hydrogen, and nitroalkyl, $R^1$ and $R^2$ together may represent substituents selected from a class consisting of dialkyl and diaryl, and $R^1$ and $R^2$ may also represent a combined group selected from a class consisting of polymethylene and oxapolymethylene the terminal carbon atoms of which are bonded to N.

4. A composition of matter comprising a copolymer of 1,3-butadiene and acrylonitrile, and as a softener therefor an N-substituted carbamate having the following general formula:

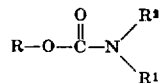

wherein R represents a member selected from a group consisting of alkyl and nitroalkyl, $R^1$ represents a substituent selected from a class consisting of alkyl, aryl, 1-ethyl-4-(1-ethylpentyl)-3,5-dioxacyclohexyl and tetrahydrofurfuryl, $R^2$ represents a substituent selected from a class consisting of hydrogen, and nitroalkyl, $R^1$ and $R^2$ together may represent substituents selected from a class consisting of dialkyl and diaryl, and $R^1$ and $R^2$ may also represent a combined group selected from a class consisting of polymethylene and oxapolymethylene the terminal carbon atoms of which are bonded to N.

5. A composition of matter comprising a copolymer of 1,3-butadiene and acrylonitrile, and a sufficient quantity of butyl dibutyl carbamate incorporated therein to soften said copolymer.

6. A composition of matter comprising a copolymer of 1,3-butadiene and acrylonitrile, and a sufficient quantity of amyl dibutyl carbamate incorporated therein to soften said copolymer.

ARTHUR W. CAMPBELL.

REFERENCES CITED

The following references are of record in the file of this patent:

UNITED STATES PATENTS

| Number | Name | Date |
| --- | --- | --- |
| 2,041,733 | Werntz | May 26, 1936 |
| 2,182,359 | Smith | Dec. 5, 1939 |
| 2,197,479 | Meigs | Apr. 16, 1940 |
| 2,234,204 | Starkweather | Mar. 11, 1940 |
| 2,296,331 | Bogemann | Sept. 22, 1942 |

Certificate of Correction

Patent No. 2,433,595.

December 30, 1947.

ARTHUR W. CAMPBELL

It is hereby certified that errors appear in the printed specification of the above numbered patent requiring correction as follows: Column 1, line 22, for "closs" read *class*; line 31, for the word "When" read *While*; lines 49 and 50, for "mixtures" read *mixture*; and that the said Letters Patent should be read with these corrections therein that the same may conform to the record of the case in the Patent Office.

Signed and sealed this 27th day of April, A. D. 1948.

[SEAL]

THOMAS F. MURPHY,
*Assistant Commissioner of Patents.*